April 27, 1965   G. LOOSER   3,180,909
PROCESS AND APPARATUS FOR FORMING TUBULAR FILMS AND THE LIKE
Filed Feb. 10, 1961
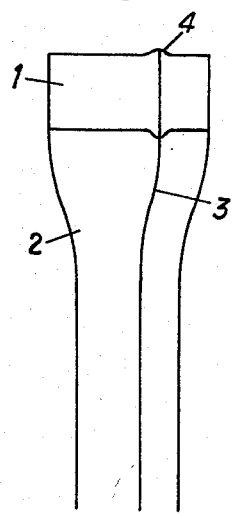
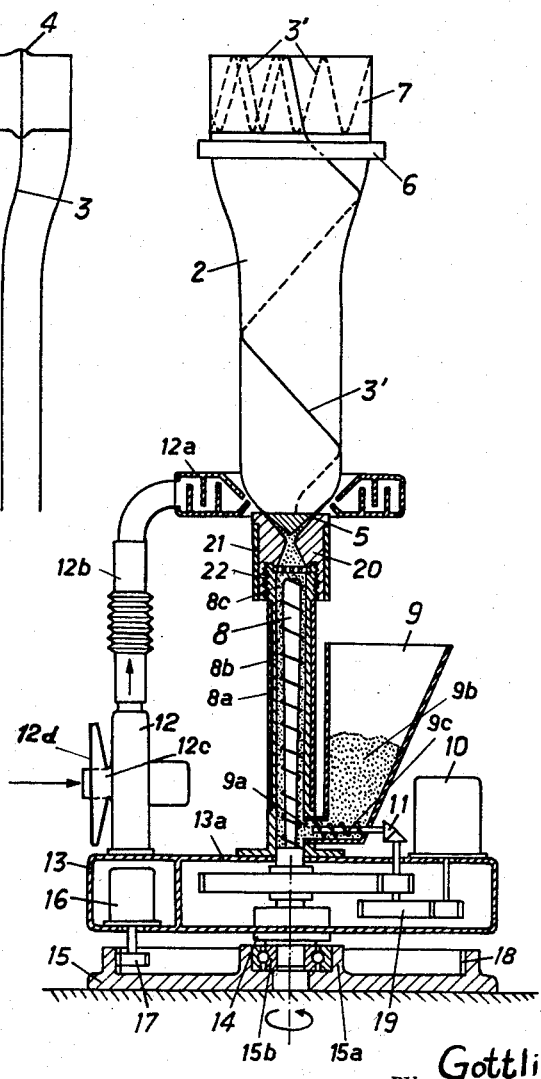
INVENTOR.
BY Gottlieb Looser
Werner W. Kleeman
Attorney

3,180,909
PROCESS AND APPARATUS FOR FORMING TUBULAR FILMS AND THE LIKE
Gottlieb Looser, Zurich, Switzerland, assignor to Verwaltungsgesellschaft des Werkzeugmaschinenfabrik Oerlikon, Oerlikon-Zurich, Switzerland, a corporation of Switzerland
Filed Feb. 10, 1961, Ser. No. 88,456
Claims priority, application Switzerland, Feb. 15, 1960, 1,668/60
11 Claims. (Cl. 264—95)

The present invention relates to a novel process and apparatus for the production of blown extruded tubing or films and the like, wherein a thermoplastic material is first brought into a condition of a melt, and then, extruded or ejected through an annular or ring-shaped slotted nozzle or blow head. The emerging thermoplastic melt may be blown or expanded by means of a gaseous medium and upon solidification of the thus formed extruded tubing or the like is passed between squeeze or pinch rollers and removed from the system. It is to be understood that the term "tubular film" or "tubing" as employed herein is also intended to encompass foils, sheets, films and the like which may be formed and readily handled in accordance with the teachings of the present invention. It is equally possible to practice the teachings of the present invention with tubing which is cut open lengthwise at least at one side thereof to form a thermoplastic foil.

It is known to form thermoplastic polymers, as for example, polyethylene (HD and LD types), polystyrene and its copolymers, polymethacrylic esters, cellulose acetobutyrate, polyvinylchloride and its copolymers, into tubular films and the like wherein a suitable thermoplastic material is processed in such a manner that it is brought into a molten condition and extruded by means of ring-shaped blow heads or nozzles. By regulating the volume of a gaseous medium applied internally of the formed tubular film and, through suitable cooling and withdrawing of the same via pinch rollers, a correspondingly large tubular film may be produced, depending of course on the physical characteristics of the apparatus employed. Additionally, if desired, such tubular film may be cut lengthwise on one or both of its edges and removed in the form of a foil or sheet. The tubular films and sheetings thus produced have been found, by way of example, to be extremely suitable for use as packing material and the like.

An important problem encountered in the production of blown tubular films, foils and the like is that the strength or thickness of the wall of the solidified thermoplastic materials under certain circumstances displays specific variations about its entire periphery. In the methods and apparatus heretofore known in the art, it has not been found possible to effectively ensure that the produced tubular film emerging from the nozzle means will exhibit a constant and uniform wall thickness and strength. Such fluctuations and variations may be due, for example, to material adhering to the inner nozzle surface, differing viscosities appearing in the material, irregularities in the flow velocities of the material, improper disrtibution of cooling air in the cooling system and so forth.

Generally, upon leaving the squeeze rollers the produced thermoplastic film is caused to be wound about take-up rollers. It has been found that when working with films possessing varying wall thicknesses that these regions of the film are clearly evident when the film is wound onto the take-up roller, since the varying regions of thickness are added to one another during the winding operation. A thermoplastic film wound in the form of an annular body about a take-up roller will under certain circumstances exhibit marked undulations and humps due to the aforementioned adding or pyramiding effect of the thickened portions. This pyramiding effect is due to the fact that the thickened portions of the tubular film extend substantially in a common plane lengthwise of the film and thus during winding thereof are always wound on a localized region of the take-up roller. Various means have been proposed in order to overcome these disadvantages, such as employing oscillating cooling rings, movable nozzle portions and so forth, but none have proved to be markedly successful in solving this problem.

An attempt has been made to distribute the irregularities of the thickened portions of the film during production thereof by imparting relative rotation to the nozzle means with respect to the winding unit. Such a system requires relatively large area for the installation and rotational movement of the components and does not ensure that the characteristics of the molten thermoplastic prior to extrusion thereof are unchanged since the melt is caused to move in an irregular path and must change its direction of travel.

Accordingly, it is an important object of the present invention to provide a novel method of, and means for, the production of tubular films, sheets and the like which effectively prevents pyramiding of the irregular portions of the produced film when removed by a winding unit.

It is another object of the present invention to provide a novel method of, and means for, preventing or minimizing the likelihood of formation of irregularities on the walls of a produced tubular film and, if the same should occur, effectively distributes such irregularities in a manner that said tubular film when in wound condition will not be unduly subjected to stresses and tension.

Another object of the present invention is to provide an apparatus for the production of blown tubular films and the like which is compact in its structure, relatively simple in construction, highly reliable in operation as well as economically feasible to produce.

Yet another object of the present invention is to provide an extrusion process and apparatus therefor which permits a flow movement of a molten thermoplastic mass in a continuous non-curving path so that the physical characteristics of said mass at any cross-sectional plane taken along its path of movement are substantially uniform.

Still a further object of the present invention is to provide means ensuring that the velocity of flow of a molten thermoplastic mass in the direction of a nozzle member is substantially uniform thereby tending to eliminate or at least minimize the likelihood of irregular wall thicknesses forming at a blown tubular film or the like.

A further important object of the present invention is to provide means permitting relative rotational movement between a nozzle member and a winding unit for receiving a produced tubular film or the like in order to effectively distribute irregularities over the entire outer surface of said tubular film to prevent pyramiding of such irregularities when the film is wound onto a take-up roller or the like.

Thus, in accordance with the teachings of the present invention there is provided a novel method and system for the production and handling of blown tubular films, sheets, foils and the like wherein a table member adapted to be rotated relative to a winding unit including pinch rollers and take-up roller means is arranged to support a nozzle member for blowing the molten thermoplastic material. Suitable means are provided which interconnect the nozzle member with a supply hopper for heating granular thermoplastic material into a molten mass and then feeding the molten mass unidirectionally and in a linear path into said nozzle member. The substantially linear movement of the molten mass at least minimizes the likelihood of irregularities from forming in the wall of the tubular film since the even flow conditions provided tend to keep the characteristics of the molten material as uniform as possible. The relative rotational movement of the nozzle member with respect to the winding unit ensures that if irregularities appear in the tubular film such irregularities are distributed about the circumference or outer surface of the film. Thus, upon winding onto the take-up rollers these irregularities will not fall on top of one another at the same region of the take-up roller and pyramiding thereof will not occur; but rather, such irregularities are spaced over the length of said take-up roller, and by avoiding the formation of undulations or extreme humping of the tubular film it will not be unduly subjected to stresses and tension when in a wound condition. It is, of course, possible to rotate the winding unit with respect to the nozzle member or to keep both the extruded table and winding unit stationary and rotate the nozzle member. It has been found that with a rotational speed of about 1 to 5 revolutions per minute excellent results have been obtained. It is equally possible to have the table periodically change its direction of rotation rather than be a fixed direction. Such would be advantageous, for example, if the electrical connection for the drive means or heating means is carried out more practically by employing a flexible cable rather than sliding contacts. The apparatus designed according to the present invention permits a thermoplastic material to be brought into a condition of a melt and then linearly fed into a nozzle member rotatable with respect to a winding unit. At a result irregularities appearing on the formed tubular film will be distributed over the circumference thereof and also over the length of the take-up roller resulting in an improved and more workable product.

These and still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the drawings:

FIGURE 1 discloses a take-up roller for winding thereon an extruded tubular film or foil; and FIGURE 2 discloses a cross-sectional view of a preferred embodiment of an extruding apparatus designed according to the present invention and employing a rotatably arranged extruder or blow head assembly and fixed pinch rollers.

Referring now to FIGURE 1 of the drawings there is diagrammatically illustrated a take-up roller 1 onto which is wound an extruded tubular film or sheet 2 formed of a thermoplastic material in a manner heretofore known in the art. Reference numeral 3 is directed to a line extending lengthwise of the film 2 and schematically depicts a thickened or irregular portion of the emerging film which may appear, for example, as a result of material adhering to the wall of the blow head or slotted nozzle tending to cause irregularities or varying wall thicknesses in the produced tubular film 2. Thus, as the tubular film 2 is wound around the take-up roller 1 one or more bumps 4 appear across the length of the roller 1 depending, of course, on the number of regions or areas on the peripheral surface of the tubular film 2 exhibiting such irregular or thickened regions 3. In tubular films 2 heretofore produced in the art, for example in a manner in FIGURE 1, the thickened or irregular areas 3 of the film 2 extended lengthwise of said film and were substantially disposed in respective common planes. Consequently, as the winding of the film 2 on the rollers 1 progressed, the thickened or irregular regions 3 successively deposited themselves at approximately the same location on the roller 1, thereby continually increasing the size of the bumps 4. As a result, the thermoplastic film 2 was subjected to undersirable stresses and tensioning. This is especially true if the force for carrying out the winding operation is of considerable magnitude.

In FIGURE 2 there is shown an arrangement for producing tubular films, tubing, sheets or the like which effectively ensures that the possibility of formation of irregularities in the tubing is minimized and, should such irregularities appear, then they will be distributed around the surface of the tubing such that upon winding of the tubing on the take-up roller the irregularities will be distributed across the entire length of the roller, rather than carrying out the undesirable pyramiding effect heretofore mentioned. The extrusion system shown in FIGURE 2 comprises a support member 15 having a central hub portion 15a carrying bearing means 15b rotatably supporting a hollow table member 13 as depicted by reference numeral 14. The support member 15 is provided with an internal gear 18 which meshes with a pinion 17 driven by a reversible drive motor 16 which may be arranged internally of the hollow table member 13 thereby imparting rotational movement to said table member 13 and the components of the extrusion system carried thereon. The drive motor 16 may be suitably chosen to provide unidirectional or reversing rotational movement for the table member 13.

Upon the upper surface 13a of the rotatable table member 13 there is arranged a vertically extending tubular guide member 8a adapted to direct and guide a thermoplastic melt in the direction of nozzle means including an annular blow nozzle 5 provided with a blow or nozzle head 20 arranged within blow head housing 21. The blow head 20 threadingly engages at 22 the upper end 8c of an inner sleeve 8b provided for the tubular member 8a. At the lower end of the tube 8a there is arranged a lateral passageway 9a communicating with a supply hopper 9 adapted to contain pulverant or granular thermoplastic material 9b which is subsequently to be brought into molten condition by suitable heating means (not shown) associated with the guide tube 8a and known in the art. Arranged internally of the lateral passageway 9a and guide tube 8a are feed means such as the respective screw conveyors 9c and 8 designed to advance the granular and subsequent molten thermoplastic material, respectively, in the direction of the nozzle head 20. The molten thermoplastic is blown into an extruded tube 2 by means of a suitable gaseous medium such as air supplied to a suitable air-inlet (not shown) provided in the nozzle head 20 in any conventional manner as already known in the art. The respective screw conveyors 9c and 8 for the granular and molten thermoplastic material are driven by means of a drive motor 10 carried by table member 13 through the intermediary of gear train means 11 and 19, gear train 19 preferably being arranged internally of said table member.

Located adjacent the outlet side of the blow nozzle 5 is an air baffle unit 12a supplied with air from a blower unit 12 via conduit 12b and supported by the table member 13. At the inlet end 12c of the blower unit 12 there is arranged a cooling unit 12d for cooling the air supplied to the outer surface of the extruded tube 2 in order to aid in solidification thereof. Forwardly of the air baffle 12a there is arranged squeeze or pinch rollers 6 (for convenience only one is shown) and adjacent thereto a take-up roller 7 for winding thereon of the tubular film or sheet 2. The squeeze rollers 6 and take-up roller 7 in the illustrated embodiment are fixedly positioned relative to the nozzle means 5 carried by the rotatable table member 13, whereby relative rotational movement of the nozzle means 5 with respect to the squeeze rollers 6 resutls. Thus, if for any one or more of the reasons mentioned herein irregularities or thickened portions 3' appear on the wall of the formed thermoplastic tubular film 2, then by virtue of the relative movement of nozzle means 5 with respect to squeeze rollers 6 about the longitudinal axis of the tubular film 2, such thickened portions or irregularities will be distributed over the entire surface of the tubular film, as for example, in the form of a helically extending screw line 3'. Consequently, upon winding of the thermoplastic film onto the take-up roller 7, the irregularities or thickened portions 3' of the film will be distributed over the entire length of the take-up roller 7 as shown in phantom lines in FIGURE 2.

As a result, the likelihood of the formation of undesirable bumps or swellings appearing on the surface of the roller 7 which would apply stresses and tension forces to the film is greatly minimized. Moreover, the aforementioned pyramiding effect of the thickened regions, heretofore experienced in the art, is minimized or substantially avoided as the thickened portions of the tubular film 2 are not localized at one or more specific points on the roller 7, but rather, substantially distributed over the entire length thereof.

It is, of course, to be understood that various changes and modifications of the extrusion system shown will be apparent to those skilled in the art. One of the essential requirements of the system shown is that there be a relative movement between the nozzle member 5 and pinch or squeeze rollers 6 in order to effect a distribution of thickened portions or irregularities about the surface of the tubular film and across the length of the take-up roller 7. Thus, for example, it would be possible to maintain the extruder assembly with the exception of the extrusion nozzle means 5 spatially fixed with respect to the squeeze rollers 6. Then, by employing suitable packings and seals it is possible to carry out rotation of the nozzle means 5 relative to the squeeze rollers 6 and the remaining components of the extruder assembly and about the longitudinal axis of the formed tubular film 2. In a similar manner, if the extruder assembly and nozzle means are held spatially fixed it is then necessary to rotate the wind-up assembly and, in particular, the squeeze rollers 6 relative to the nozzle 5. This can be achieved, for example, by mounting the wind-up assembly comprising the take-up roller 7 and one or more squeeze rollers 6 on a rotatable support which is rotatably movable on guide rails. The latter may then be driven by fixedly arranged drive means through the intermediary of gear means such as a pinion engaging a gear ring associated with the rotatable support for the wind-up assembly. It has also been found that by arranging the components of the system in the manner as disclosed and, more specifically, by ensuring that once the thermoplastic material is brought into molten condition its direction of travel is not altered there is less likelihood of turbulent flow and velocity changes of the molten mass from occurring. Additionally, this minimizes or greatly reduces the likelihood of irregularities from appearing on the formed tubular film and a more desirable product results.

Having thus described the present invention what is desired to be secured by United States Letters Patent, is:

1. A method for producing tubular films and the like; comprising the steps of subjecting a thermoplastic material to heat to bring it into a condition of a melt, feeding the entire melted thermoplastic material solely through a vertical linear path of travel in the direction of a nozzle member fixedly mounted upon a turntable which is rotating relative to a winding unit, and extruding said melt through said relatively rotating nozzle member in the direction of said linear path of travel while applying a gaseous medium to form a blown tubular film wherein irregularities of thickness of the wall of the tubular film are distributed about the surface thereof.

2. A method for producing and handling tubular films and the like; comprising the steps of subjecting a thermoplastic material to heat to bring it into a condition of a melt, feeding the melted thermoplastic material solely through a vertical linear path of travel in order to maintain the physical properties of said melt as uniform as possible and upwardly in the direction of a nozzle member mounted upon a turntable which is rotating relative to a winding unit, thereafter extruding said melt through said relatively rotating nozzle member in the direction of said vertical linear path of travel while applying a gaseous medium to form a blown tubular film, continuously extruding the melt through the nozzle while the turntable is rotating so that irregularities of thickness of the wall of the tubular film are distributed about the surface thereof, then advancing said blown tubular film through pinch rollers to compress said tubular film, and finally winding said compressed tubular film onto a take-up roller such that said irregularities of thickness of the wall of the tubular film are distributed over the length of said take-up roller.

3. In a system for the production of tubular films and the like, a table member rotatable about a vertical axis of rotation, a supply hopper for granular thermoplastic material operatively associated with said table member, nozzle means for blowing said thermoplastic material when in a molten condition into a tubular film, means substantially coaxial with said vertical axis and communicating said supply hopper with said nozzle means for receiving said granular thermoplastic material and permitting movement of the same when in a molten condition only in a vertical linear path into said nozzle means, heating means for bringing said granular thermoplastic material first when disposed in said communicating means into a condition of a melt, a winding unit including pinch roller means and take-up roller means for successively compressing and winding said tubular film, and means cooperable with said table member to impart rotational movement to said nozzle means relative to said pinch roller means.

4. In a system for the production of tubular films and the like according to claim 3, wherein said communicating means includes a vertically arranged guide tube having one end fixedly secured to said table member and the other end supporting said nozzle means.

5. In a system for the production of tubular films and the like according to claim 4, wherein said cooperable means includes gear means and drive means for rotating said table member.

6. In a system for the production of tubular films and the like according to claim 5, wherein said drive means is a reversible motor for periodically changing the direction of rotation of said table member.

7. In a system for the production of tubular films and the like; a table member rotatable about a vertical axis of rotation, a supply hopper for granular thermoplastic material supported by said table member, nozzle means for blowing said thermoplastic material when in a molten condition into a tubular film, vertical guide means including a vertically arranged feed screw therein communicating said supply hopper with said nozzle means for receiving said granular thermoplastic material and permitting movement of the same when in a molten condition in a linear path into said nozzle means, said vertical guide means being substantially coaxial with said vertical axis and having one end fixedly secured to said table member with the other end supporting said nozzle means, said one end of said guide means being provided with aperture means communicating said supply hopper with the interior of said guide means for movement of granular thermoplastic material from said supply hopper into said interior of said guide means, heating means for bringing said granular thermoplastic material when disposed in said guide means into a condition of a melt, a winding unit including pinch roller means and take-up roller means for successively compressing and winding said tubular film, and drive means for imparting relative rotational movement between said nozzle means and said winding unit about a longitudinal axis of said tubular film.

8. In a system for the production of tubular films and the like, a table member rotatable about a vertical axis of rotation, a supply hopper for granular thermoplastic material supported by said table member, nozzle means for blowing said thermoplastic material when in a molten condition into a tubular film, vertically arranged guide means communicating said supply hopper with said nozzle means for receiving said granular thermoplastic material and permitting movement of the same when in a molten condition in a vertical linear path into said nozzle means, said guide means being substantially coaxial with said vertical axis and having one end fixedly secured to said table member with the other end supporting said nozzle means, said one end of said guide means being provided with aperture means communicating said supply hopper with the interior of said guide means for movement of granular thermoplastic material from said supply hopper into said interior of said guide means, heating means for bringing said granular thermoplastic material when disposed in said guide means into a condition of a melt, respective feed means cooperable with said supply hopper and said guide means for advancing said granular and then molten thermoplastic material in the direction of said nozzle means, a winding unit including pinch roller means and take-up roller means for successively compressing and winding said tubular film, and drive means for imparting relative rotational movement between said nozzle means and said winding unit about a longitudinal axis of said tubular film.

9. In a system for the production of tubular films and the like according to claim 8, wherein said feed means includes separate screw conveyors arranged internally of said supply hopper and said vertically arranged guide means, and common drive means for said separate screw conveyors.

10. Apparatus for the extrusion of tubular films comprising in combination: a turntable mounted for rotation about a vertical axis, a vertical extruder supported on said turntable, said vertical extruder being substantially coaxial with said vertical axis and including a substantially vertical guide tube and feed means therein for advancing molten thermoplastic material solely in a vertical linear path of travel towards the upper end of said vertical guide tube and in the direction of nozzle means, nozzle means operatively connected to the upper end of the vertical guide tube for blowing the thermoplastic material when in molten condition into a tubular film, and drive means for imparting rotational movement to said turntable.

11. Apparatus for the extrusion of tubular films comprising in combination: a turntable mounted for rotation about a vertical axis, a vertical extruder supported on said turntable, said vertical extruder being substantially coaxial with said vertical axis and including a vertical guide tube having its lower end mounted on said turntable and a vertical feed screw therein for advancing molten thermoplastic material solely through a vertical linear path of travel towards the upper end of said vertical guide tube and in the direction of nozzle means, nozzle means operatively connected to the upper end of the vertical guide tube for blowing the thermoplastic material when in molten condition into a tubular film, and drive means for imparting rotational movement to said turntable at least in one direction of rotation.

References Cited by the Examiner

UNITED STATES PATENTS

| 2,499,398 | 3/50 | Lyon | 18—14 |
| 2,697,852 | 12/54 | Bailey | 18—14 |
| 2,844,846 | 7/58 | Kronholm | 18—14 |

FOREIGN PATENTS 1,215,929  11/59  France.

ALEXANDER H. BRODMERKEL, *Primary Examiner.*

WILLIAM J. STEPHENSON, MICHAEL V. BRINDISI, *Examiners.*